United States Patent Office 3,480,688
Patented Nov. 25, 1969

3,480,688
PREPARATION OF ISOPRENE
Kenneth J. Frech, Tallmadge, and Victor J. Anhorn, Akron, Ohio, assignors to The Goodyear Tire & Rubber Company, Akron, Ohio, a corporation of Ohio
No Drawing. Continuation-in-part of application Ser. No. 492,861, Oct. 4, 1965. This application June 30, 1966, Ser. No. 561,717
Int. Cl. C07c 5/24
U.S. Cl. 260—680                  7 Claims

ABSTRACT OF THE DISCLOSURE

There is disclosed a method of preparing isoprene which comprises rearranging the carbon skeleton of 2-methyl-1-pentene or 4-methyl-2-pentene to form 3-methyl-2-pentene and subsequently pyrolyzing the 3-methyl-2-pentene to form isoprene. There is further disclosed the fact that 2-methyl-1-pentene and 4-methyl-2-pentene can be prepared by the dimerization of propylene and some specific methods for the carbon skeleton rearrangement or isomerization of 2-methyl-1-pentene and 4-methyl-2-pentene.

---

This application is a continuation-in-pat of application Ser. No. 492,861, filed Oct. 4, 1965, now abandoned, which in turn was a continuation-in-part of application Ser. No. 442,786, filed Mar. 25, 1965, now abandoned, which in turn was a continuation-in-part of application Ser. No. 377,451, filed June 8, 1964, now abandoned, which in turn was a continuation-in-part of application Ser. No. 732,622, filed May 2, 1958, now abandoned.

This invention relates to a process for the production of isoprene.

Isoprene has been produced by several different methods, for example, by the destructive distillation of certain of the terpene hydrocarbons, by chlorination of isoamyl chloride to give 2-methyl-2,4-dichlorobutane which reacts with bases to give isoprene and by dehydration of certain alcohols. Isoprene has also been produced by dehydrogenation of isopentene and isopentane and as a by-product of petroleum industry operations by cracking of low boiling hydrocarbon fractions and low molecular weight polymers produced in refining and reforming processes. None of these processes of the prior art produces isoprene of sufficient purity economically. Synthetic rubber made from isoprene cannot now compete with natural rubber at present prices.

It is an object of this invention to provide an economical method of producing realtively pure isoprene. Another object of this invention is to provide a method of producing isoprene from lower alkene hydrocarbons by forming from such lower alkenes, materials which can by pyrolyzed to produce isoprene, and pyrolyzing them to form isoprene.

Of the lower alkenes that could be used to produce isoprene, the pentenes and the hexenes are the most attractive from the standpoint of cost and availability. Certain of the pentenes have been proposed as starting material for the preparation of isoprene using dehydrogenation procedures to convert the pentene to isoprene. This has not been practical however, because of the side reactions that occur under dehydrogenation conditions.

The pyrolysis of branched chain hexenes has also been proposed as a method for producing isoprene but the yields reported are not very high, and no economically practical process has heretofore been developed based on these compounds.

We have found that some of the branched chain hexenes do not yield isoprene as a major product on pyrolysis. For example, on pyrolysis, 2-methylpentene-1, 4-methylpentene-2, 4-methylpentene-1 and 2,3-dimethylbutene-2 give very low yields of isoprene and the efficiency of a process based on conversion of these compounds to isoprene is very low. This is shown in the following experiments in which these compounds were pyrolyzed.

The apparatus used for the pyrolysis experiments comprised a stainless steel tube ½ inch in diameter, 12 inches long packed with ⅛ to ¼ inch Vycor Chips (high temperature resistant glass made by Corning Glass Company). A thermowell containing four thermocouples for measuring the internal temperature of the column was located in the center of the tube. The tube had a total free space of about 20–25 cc.

The tube was heated to about 800° C. and the material to be pyrolyzed, preheated to about 600° C. by passing it through a ¼ inch U-tube preheater, was passed through the tube at a contact time of approximately 0.012 to 0.046 second at a pressure of 25–30 millimeters of mercury. The product was condensed by passing it through a water cooled condenser and a receiver immersed in a Dry Ice-acetone bath. Then it was analyzed and the percent conversion to isoprene determined. The data obtained are tabulated in the table below.

TABLE 1

[Pyrolysis of 2-methylpentene-1]

| | Temperature, °C. | Percent Conversion to Isoprene | Efficiency of Conversion to Isoprene |
|---|---|---|---|
| Contact Time in Seconds: | | | |
| 0.015 | 798 | 8.1 | 11.1 |
| 0.022 | 801 | 9.2 | 11.3 |
| 0.032 | 798 | 13.2 | 16.2 |
| [Pyrolysis of 4-methylpentene-2] | | | |
| 0.015 | 802 | 5.4 | 6.9 |
| 0.030 | 806 | 6.5 | 7.3 |
| 0.041 | 793 | 7.6 | 9.6 |
| [Pyrolysis of 4-methylpentene-1] | | | |
| 0.018 | 803 | 1.8 | 1.8 |
| 0.024 | 799 | 1.4 | 1.4 |
| 0.046 | 800 | 1.9 | 1.9 |
| [Pyrolysis of 2,3-dimethylbutene-2] | | | |
| 0.012 | 798 | 1.6 | 5.7 |
| 0.025 | 800 | 12.3 | 12.7 |
| 0.045 | 801 | 20.8 | 16.1 |

Contact time is the approximate length of time in seconds spent in the reactor by a molecule of the feed. It can be calculated from the following formula:

$$\text{Contact time} = \frac{3.6 \times 10^3 (V_1)(T_2)(P_3)}{(M_1)(V_2)(T_1)(P_4)}$$

where $M_1$ = moles of reactant per hour
$T_1$ = reactor temperature in ° Kelvin
$T_2$ = 273° Kelvin
$P_3$ = reactor average pressure in millimeters
$P_4$ = standard atmospheric pressure in millimeters
$V_1$ = volume of the reactor free space in cubic centimeters
$V_2$ = volume of gas in cc. per mole at standard conditions of temperature and pressure (reactant vaporized) ($2.24 \times 10^4$)
$3.6 \times 10^3$ = No. seconds in one hour We have also found that certain branched chain hexenes, which we shall call isoprene precursors throughout this specification, can be pyrolyzed to form isoprene in relatively high yields. (The term isoprene precursor is used to mean branched chain hexene compounds which have a carbon skeleton structure such that when the structure cracks at the position beta to the double bond, isoprene is the major component of the products.) A process based on the conversion of these compounds to isoprene is efficient. Furthermore, we have discovered that some of the branched hexenes which do not pyrolyze to yield isoprene economically can be converted to isoprene precursors and then pyrolyzed to form isoprene in good yields and with relatively high overall efficiency. By this combination of steps we can produce isoprene utilizing compounds which have not heretofore served as raw materials for the preparation of isoprene.

Thus, according to this invention, isoprene is prepared by isomerizing a branched chain hexene to an isoprene precursor and pyrolyzing the isoprene precursor to form isoprene.

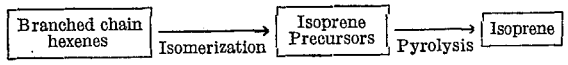

Isomerization occurs by double bond shift from one location to another in the carbon chain and by carbon skeleton rearrangement. Isomerization by double bond shift is shown by the isomerization of 2-methylpentene-1 to 2-methylpentene-2 as illustrated in the following equation:

Isomerization by rearrangement of the carbon skeleton is shown by the isomerization of 2-methylpentene-1 to 2-ethylbutene-1, as illustrated in the following equation:

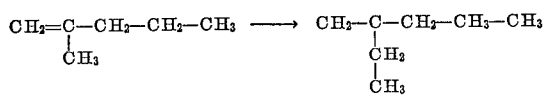

In the isomerization of the branched chain hexenes; either or both types of reaction may occur and a mixture of products can be obtained which on pyrolysis yield isoprene.

The pyrolysis of 2-methylpentene-2 to isoprene may be represented by the following equation:

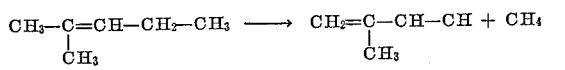

The pyrolysis of 2-ethylbutene-1 to isoprene can be represented by the following equation:

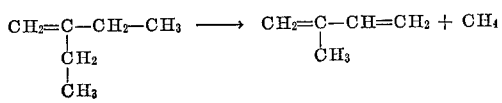

Thus in the above illustrative compounds, isoprene is formed when 2-methylpentene-2 cracks under pyrolysis conditions at the bond between the 4- and 5-carbon atoms of the five carbon chain and when 2-ethylbutene-2 cracks at the bond between the 3- and 4-carbon atoms of the four carbon chain.

Although the isoprene precursors can be prepared both by double bond migration and by carbon skeleton rearrangement, the most efficient method is by effecting double bond migration in certain selected branched chain hexenes because of the fewer side reactions that occur in this type of isomerization. Thus the preferred method comprises isomerizing at least one compound selected from the group consisting of 2,3-dimethylbutene-2, 2-methylpentene-1, 3-methylpentene-1, 4-methylpentene-1 and 4-methylpentene-2 and pyrolyzing to isoprene.

The branched chain hexenes are available as by-products of the petroleum industry. They are readily prepared from lower alkenes by the addition or polymerization of alkenes containing less than 6 carbon atoms. They can also be made from higher hydrocarbons by reforming operations.

The following examples illustrate the preparation of branched chain hexenes from lower alkenes.

EXAMPLE 1

Polymerization of propylene in a homogeneous catalyst system

A one-gallon stainless steel autoclave was flushed with nitrogen to remove all oxygen from the autoclave and charged with 1055 grams of liquid propylene and 20 grams of triisobutyl-aluminum diluted with 100 milliliters of n-heptane. The mixture was heated to 200 to 214° C. for 10 hours. The product was distilled. It consisted chiefly of 2-methylpentene-1.

Polymerization of propylene over nickel oxide-silica alumina catalyst

The reactor used in these examples was a stainless steel tube 44 inches long having an inside diameter of 0.824 inch and a gross volume of approximately 385 cc. The reactor contained 300 cc. of ⅛ inch pellets which were prepared as follows: Two samples of Houdry S-65 catalyst, a silica alumina catalyst (sold by the Houdry Process Corp.) containing 86 percent by weight of $SiO_2$ and 12 percent by weight of $Al_2O_3$, having a surface area of 375 square meters per gram and a bulk density of 0.54 kilogram per liter, were saturated with an aqueous $Ni(NO_3)_2$ solution to give a final 2.8 and 3.0 weight percent of Ni as follows: Two samples were soaked in nickel nitrate solutions containing 0.0405 and 0.0425 gram of Ni per cc. of solution respectively and dried for 8 hours at 110° G. They were then calcined at 500° C. in dry air for 4 to 5 hours. The catalysts thus prepared were used in Examples 2 and 3, respectively, below.

Liquid propylene was pressured into the top of the reactor by means of nitrogen pressure, the propylene being fed from a feed tank through a rotameter into the reactor. The reactor was heated and maintained at the desired temperature by means of boiling isopropyl alcohol in a constant temperature jacket around the reactor. The temperature of the reactor was regulated by controlling the pressure over the isopropyl alcohol. A constant pressure was maintained in the reactor system itself by means of a pressure control valve. The propylene polymer and unreacted propylene were taken from the bottom of the reactor and passed through a water-cooled condenser and a series of Dry Ice-acetone cooled traps where the condensable hydrocarbons were collected. The noncondensable gases were collected in a gas holder and subsequently metered and analyzed.

|  | Example 2 | Example 3 |
|---|---|---|
|  | Catalyst | |
|  | NiO on Houdry S-65 (Containing 2.8% Ni) | NiO on Houdry S-65 (Containing 3.0% Ni) |
|  | Feed | |
|  | 50% Propylene 50% Propane | 22% Propylene 78% Propane |
| Pressure p.s.i.g.[1] | 600 | 700 |
| Temperature, °C | 58–101 | 81–83 |
| Weight Hourly Space Velocity of Propylene [2] | 1.3 | 1.2 |
| Contact Time in Minutes | 10.7 | 5.6 |
| Propylene Conversion to Polymer, percent | 51.3 | 36.9 |
| Polymer Composition by Distillation: | | |
| $C_4$ and $C_5$ hydrocarbons, percent | 1.0 | |
| $C_6$ hydrocarbons (hexenes) | 35.2 | 42.8 |
| $C_9$ hydrocarbons | 30.1 | 32 |
| $C_{12}$ and higher hydrocarbons | 29.7 | 25 |
| Composition of $C_6$ hydrocarbon (hexene) fraction: | | |
| 4-methylpentene-2, percent | 46.4 | 47.6 |
| 2-methylpentene-1 and/or trans. 2-hexene and/or 3-hexene | 26.2 | 30.2 |
| 2-methylpentene-2 and/or cis-2-hexene | 14.4 | 15.9 |
| 2,3-dimethylbutene-2 | 2.5 | 4.3 |
| Unidentified | 10.3 | |

[1] P.s.i.g. is defined as the pressure in pounds per square inch gauge reading. The zero reading on this scale is atmospheric pressure.
[2] Weight Hourly Space Velocity is defined as the weight of feed per weight of catalyst bed per hour.

Polymerization of propylene over silica-alumina catalyst

The reactor used in these examples was a stainless steel tube 30 inches long having an inside diameter of 1⅛ inches. The reactor had a gross volume of approximately 750 cc. A thermowell was centrally located within the reactor and contained four thermocouples spaced at different points up through the reactor to measure the temperature of the catalyst bed. The catalyst employed was a fluidized silica-alumina catalyst containing 86.6 percent by weight of $SiO_2$ and 13.3 percent by weight of $Al_2O_3$ having a bulk density of 0.49 kilogram per liter (sold by American Cyanamid Co. as Aerocat 60/70) occupying approximately 300 cc. The reactor was heated by means of a furnace having three separately spaced 750 watt resistance heaters mounted on the outside of the reactor.

Liquid propylene under nitrogen pressure of 1000 pounds per square inch was measured by means of a rotameter into the bottom of the reactor. A constant pressure of 600 pounds per square inch gauge was maintained in the reactor by means of a pressure control valve. Propylene polymers and unreacted propylene were removed from the top of the reactor and passed through a water-cooled condenser and a series of Dry Ice-acetone cooled traps where the condensable hydrocarbons were collected. The noncondensable gases were collected in a gas holder and subsequently metered and analyzed.

Isomerization of branched chain hexenes to isoprene precursors, particularly the isoprene precursor 3-methyl-2-pentene, by treating branched chain hexenes with various isomerization catalysts, is illustrated in the examples below in which the representative branched chain hexenes were isomerized with different catalysts.

The apparatus used for the isomerization comprised a stainless steel tube ½" in diameter and approximately 12" in length in which the particular isomerization catalyst employed in the experiments was mounted as a catalyst bed. The catalyst bed had an approximate volume of 38.5 cubic contimeters; a thermowell containing four thermocouples located in the center of the column to measure the catalyst bed temperature. The reactor was heated by a radiant heat tube furnace.

The catalyst bed was heated to the desired temperature and the material to be isomerized was passed downwardly through the catalyst bed at the LHSV (liquid hour space velocity) indicated in the particular experiments. The resultant product was recovered and collected by means of water condensers and received in a container cooled by Dry Ice-acetone. The isomerizate was then distilled and analyzed by conventional gas chromatography techniques.

EXAMPLE 6

Isomerization of 3-methyl-1-pentene over a Houdry S-16 catalyst (Houdry S-16 is a silica-alumina catalyst

|  | Example 4 | Example 5 |
|---|---|---|
|  | Catalyst | |
|  | Aerocat 60/70 | Aerocat 60/70 |
|  | Feed | |
|  | Propylene [1] | Propylene |
| Pressure, p.s.i.g | 600 | 600 |
| Temperature, °C | 288–400 | 312–406 |
| Weight Hourly Space Velocity on Propylene | 1.47 | 3.6 |
| Contact Time in Minutes | 1.1 | 0.41 |
| Propylene conversion to polymer, percent | 41.4 | 32.2 |
| Polymer Composition: | | |
| $C_4$ and $C_5$ hydrocarbons | 1.76 | 4.1 |
| $C_6$ saturated hydrocarbons | 9.2 | 11.3 |
| $C_6$ unsaturated hydrocarbons (hexenes) | 15.5 | 25.6 |
| $C_7$ and higher hydrocarbons | 62.4 | 56.6 |
| Composition of $C_6$ unsaturated hydrocarbon fraction: | | |
| 3-methylpentene-1 and/or 4-methylpentene-1 | 4.4 | 5.7 |
| 4-methylpentene-2 | 8.3 | 7.7 |
| 2,3-dimethylbutene-1 | 5.4 | 6.1 |
| 2-methylpentene-1 | 14.2 | 12.8 |
| Hexene-2 | 3.7 | 7.4 |
| 2-methylpentene-2 | 29.8 | 24.4 |
| 3-methylpentene-2 | 27.0 | 29.6 |
| 2,3-dimethylbutene-2 | 6.8 | 6.3 |

[1] The propylene feed used was technical grade propylene.

containing approximately 86% SiO₂ and 12% Al₂O₃ by weight and having a surface area of approximately 40–45 square meters per gram. This catalyst was in the form of approximately ⅛" pellets). The LHSV was 2.0 and isomerization temperature was 225° C. The analysis of the isomerizate is given in the table below.

| Recovered: | Percent |
|---|---|
| 3-methyl-1-pentene | 15.3 |
| 4-methyl-2-pentene | 4.9 |
| 2-methyl-1-pentene | 1.9 |
| 2-methyl-2-pentene | 5.1 |
| 3-methyl-2-pentene | 69.3 |
| 2-ethyl-1-butene | 3.5 |
| Total isoprene precursors | 77.9 |
| Efficiency | 91.8 |

EXAMPLE 7

Isomerization of 2-methyl-1-pentene over a Houdry S-38 catalyst (Houdry S-38 is a silica-alumina catalyst containing approximately 86% SiO₂ and approximately 12% Al₂O₃ by weight and has a surface area of approximately 100–120 square meters per gram. This catalyst was in the form of approximately ⅛" pellets). The LHSV was 3.0 and isomerization temperature was 375° C. The analysis of the isomerizate is given in the table below.

| Recovered: | Percent |
|---|---|
| 4-methyl-2-pentene | 10.6 |
| 2,3-dimethyl-1-butene | 2.4 |
| 2-methyl-1-pentene | 13.6 |
| 2-methyl-2-pentene | 24.7 |
| 3,methyl-2-pentene | 30.5 |
| 3- and 4-methyl-1-pentene | 2.4 |
| 2,3-dimethyl-2-butene | 5.4 |
| n-Hexenes | 7.2 |
| Saturates and low boiling material | 3.4 |
| Total isoprene precursors | 57.6 |
| Efficiency | 67.0 |

EXAMPLE 8

Isomerization of 4-methyl-2-pentene over a catalyst which is phosphoric acid on kieselguhr (this catalyst is prepared by soaking kieselguhr in a concentrated phosphoric acid and subsequently drying at 300° C. for approximately 5 hours. It was supplied in the form of pellets by Universal Oil Products Company). The LHSV was 2.0 and the isomerization temperature was 290° C. The analysis of the isomerizate is given in the table below.

| Recovered: | Percent |
|---|---|
| 4-methyl-2-pentene | 9.3 |
| 2-methyl-1-pentene | 9.1 |
| 2-methyl-2-pentene | 29.2 |
| 3-methyl-2-pentene | 33.5 |
| 2,3-dimethyl-2-butene | 7.7 |
| 4-methyl-1-pentene and/or 3-methyl-1-pentene | 1.8 |
| 2-ethyl-1-butene | 3.8 |
| 2,3-dimethyl-1-butene | 2.2 |
| Saturates and low boiling material | 3.4 |
| Total isoprene precursors | 68.7 |
| Efficiency | 75.4 |

As can be ascertained from Examples 6, 7 and 8, various branched chain olefins can be isomerized to readily form substantial amounts of isoprene precursors, particularly 3-methyl-2-pentene. The materials which are not isoprene precursors can be readily separated from the isoprene precursors by simple distillation techniques.

Data obtained on the pyrolysis of the isoprene precusors 2-ethyl-1-butene and 3-methyl-2-pentene are illustrated in the following example.

The same apparatus and procedure for the pyrolysis experiments listed in Table 1 were used in these examples.

PYROLYSIS OF 2-ETHYL-1-BUTENE

| Example: | Contact Time in Seconds | Temperature, ° C. | Percent Conversion to Isoprene | Efficiency of Conversion to Isoprene |
|---|---|---|---|---|
| 9 | 0.012 | 807 | 24.1 | 32.3 |
| 10 | 0.024 | 795 | 37.8 | 38.7 |
| 11 | 0.048 | 801 | 39.6 | 32.6 |
| [Pyrolysis of 3-methyl-2-pentene] | | | | |
| 12 | 0.016 | 795 | 36.3 | 74.8 |
| 13 | 0.026 | 800 | 45.4 | 63.6 |
| 14 | 0.044 | 801 | 53.2 | 67.7 |

Therefore, a preferred embodiment of this invention is the isomerization of various branched chain hexenes which are non-isoprene precursors to form 2-ethyl-1-butene and 3-methyl-2-pentene.

The examples have illustrated the formation of the branched chain hexenes from propylene using various catalyst systems, the isomerization of these materials so isoprene precursors and pyrolysis of the precursors to isoprene. The branched chain hexenes can also be prepared from other lower alkenes. For example, ethylene can be copolymerized with butenes in the presence of a catalyst to form branched chain hexenes which can be isomerized and pyrolyzed to isoprene. Organo metallic compounds such as the organo metallic compounds of aluminum, for example, trialkylaluminum compounds such as triethylaluminum, tri-n-propylaluminum, triisopropylaluminum, triisobutylaluminum and tri-n-butylaluminum, can be used as catalysts for the polymerization of lower alkenes. Other reactive compounds such as lithium aluminum hydride, alkyllithium-alkylaluminum complexes, and organo-metallic compounds of beryllium, gallium, and indium can also be used. While these catalysts can be used alone it is generally preferable to use them in solution in an inert solvent. Representative solvents which can be used are saturated aliphatic hydrocarbons such as butane, pentane, heptane, octane, cyclic hydrocarbons such as cyclohexane, methylcyclopentane, methylcyclohexane and other saturated hydrocarbons. It is obvious that the solvent for the catalyst should have a boiling point sufficiently different from the polymer being prepared that separation can be easily effected. Acid type homogeneous catalysts such as sulfuric acid of about 50% concentration in water and dilute phosphoric acid of 25–30% concentration can also be used. Dilute phosphoric acid catalyzes the formation of 4-methyl-2-pentene as the chief product.

In addition to the homogeneous type catalyst, heterogeneous systems such as the silica-alumina catalysts and nickel oxide-silica-alumina catalysts, molybdenum oxide on alumina, chromium oxide on alumina and tungsten oxide on alumina or silica alumina at temperatures of from 25 to 200° C. at LHSV's of from 0.5 to 10 can also be used to prepare the hexene compounds used as starting raw materials in the present invention. Generally, these heterogeneous catalysts yield mixtures of isomers and do not give as clean-cut reactions as do the homogeneous catalyst systems. However, by proper selection of catalyst and reaction conditions, isomers are formed which are suitable as starting materials for the preparation of isoprene.

The catalysts useful for double bond isomerization of the branched chain hexenes in this invention are the isomerization catalysts which effect double bond migration with a minimum of chain branching and cracking. Thus catalysts such as alumina, silica alumina, nickel, an acid catalysts such as acidified alumina, acidified clays, alumina hydrofluoric acid, perchloric acid, phosphoric acid and sulfuric acid, alkylsulfonic acids such as methylsulfonic acid, ethylsulfonic acid and laurylsulfonic acid, and arylsulfonic acids such as benzenesulfonic acid and paratoluenesulfonic acid, and aralkylsulfonic acids such as benzylsulfonic acids can be used.

The double bond isomerization will generally be carried out at relatively low temperature because at higher temperatures thermally induced reactions and increased catalytic activity leading to cracking and carbon skeleton rearrangement occur and cause the formation of undesired products. Of course the effect of temperature can be minimized by increasing the space velocity and/or decreasing contact times of the material being isomerized and by operating at low pressures. These factors will be adjusted and regulated all in accordance with recognized practice. Thus the temperature at which the isomerization is carried out can be varied from about −50° C. to 700° C. with LHSV of from 0.5 to 20 and operating pressures of from 1 millimeter of mercury pressure to atmospheric pressure or superatmospheric pressures of 3 atmospheres or more. The temperature at which the isomerization is carried out however, will generally be within the range of from −50° C. to 400° C. The range of from 0° to 300° C. is more preferred. The most preferred range is from 0° to 150° C. with LHSV of from 0.5 to 4.0 at one atmosphere pressure.

In the pyrolysis or cracking of the isoprene precursor the pyrolysis reaction can be carried out at various temperatures. Generally the pyrolysis reaction will be carried out in the range of from 550° C. to 1000° C. with contact time of from 2.0 to 0.001 second, shorter times being used with higher temperatures. The preferred conditions are the temperature range of from 700° C. to 900° C. and a more preferred range of from 600° C. to 800° C. with contact time in the range of from 0.5 to 0.001 second.

The process of this invention provides a method of preparing isoprene from lower alkenes which are cheap and in abundant supply. In addition, the method produces isoprene which is free from some of the contaminants that are present in isoprene prepared by other methods and which have been found to be deleterious in that they inhibit polymerization or do not enter into polymerization reactions and thus serve to dilute the monomer in the polymerization system. For example, this process produces isoprene which is free from acetylenes and from piperylenes which usually contaminate isoprene prepared by some of the other methods.

While certain representative embodiments and details have been shown for the purpose of illustrating the invention, it will be apparent to those skilled in this art that various changes and modifications may be made therein without departing from the spirit or scope of the invention.

What is claimed is:
1. The method of preparing isoprene which comprises rearranging the carbon skeleton of at least one branched chain hexene selected from the group consisting of 2-methyl-1-pentene and 4-methyl-2-pentene to form 3-methyl-2-pentene, subsequently pyrolyzing said 3-methyl-2-pentene to form isoprene and recovering said isoprene.
2. The method according to claim 1 in which the carbon skeleton of the branched chain hexenes is rearranged by subjecting said hexenes to a fixed bed carbon skeleton rearranging catalyst.
3. The method according to claim 1 in which the carbon skeleton of 2-methyl-1-pentene is rearranged to form 3-methyl-2-pentene by subjecting 2-methyl-1-pentene to a fixed bed silica-alumina catalyst comprising approximately 86 percent by weight of $SiO_2$ and approximately 12 percent by weight of $Al_2O_3$.
4. The method according to claim 1 in which the carbon skeleton of 4-methyl-2-pentene is rearranged to form 3-methyl-2-pentene by subjecting 4-methyl-2-pentene to a fixed bed catalyst comprising concentrated phosphoric acid on kieselguhr.
5. The method according to claim 1 in which the branched chain hexene is prepared by the dimerization of propylene.
6. The method according to claim 3 in which the 2-methyl-1-pentene is prepared by the dimerization of propylene.
7. The method according to claim 4 in which the 4-methyl-2-pentene is prepared by the dimerization of propylene.

References Cited

UNITED STATES PATENTS

| 2,396,416 | 3/1946 | Frey | 260—680 |
| 2,404,056 | 7/1946 | Gorin et al. | 260—680 |
| 3,104,269 | 9/1963 | Schaffel | 260—680 |

FOREIGN PATENTS

| 832,475 | 4/1960 | Great Britain. |
| 841,351 | 7/1960 | Great Britain. |

PAUL M. COUGHLIN, JR., Primary Examiner

U.S. Cl. X.R.

260—683.2, 683.15